(12) United States Patent
Iwaki et al.

(10) Patent No.: US 11,498,647 B2
(45) Date of Patent: Nov. 15, 2022

(54) CONTROL SYSTEM FOR SMALL MARINE VESSEL

(71) Applicant: YAMAHA HATSUDOKI KABUSHIKI KAISHA, Iwata (JP)

(72) Inventors: Ryutaro Iwaki, Shizuoka (JP); Shigeyuki Ozawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 121 days.

(21) Appl. No.: 17/186,063

(22) Filed: Feb. 26, 2021

(65) Prior Publication Data

US 2021/0291945 A1    Sep. 23, 2021

(30) Foreign Application Priority Data

Mar. 17, 2020  (JP) .............................. JP2020-046398

(51) Int. Cl.

| | | |
|---|---|---|
| *B63B 79/40* | (2020.01) | |
| *B63H 21/14* | (2006.01) | |
| *B63H 11/00* | (2006.01) | |
| *B63H 21/17* | (2006.01) | |
| *B63H 21/21* | (2006.01) | |

(52) U.S. Cl.
CPC .............. *B63B 79/40* (2020.01); *B63H 11/00* (2013.01); *B63H 21/14* (2013.01); *B63H 21/17* (2013.01); *B63H 21/213* (2013.01)

(58) Field of Classification Search
CPC ......... B63B 79/40; B63H 11/00; B63H 21/14; B63H 21/17; B63H 21/213
See application file for complete search history.

(56) References Cited

U.S. PATENT DOCUMENTS

| | | | |
|---|---|---|---|
| 10,167,057 B1 * | 1/2019 | Terada ...................... | B63B 1/32 |
| 2005/0273224 A1 * | 12/2005 | Ito .......................... | B63H 21/22 |
| | | | 701/93 |
| 2014/0096505 A1 * | 4/2014 | Okamoto ................ | B63B 34/10 |
| | | | 60/221 |
| 2016/0039503 A1 * | 2/2016 | Kinoshita ............. | B63H 11/113 |
| | | | 415/35 |

OTHER PUBLICATIONS

Yamaha Motor Co., Ltd, "Manual for Marine Jet VXR", https://www.yamaha-motor.co.jp/marine/lineup/marinejet/pdf/vxr.pdf. Aug. 2017, 104 pages.

* cited by examiner

*Primary Examiner* — Stephen P Avila
(74) *Attorney, Agent, or Firm* — Keating and Bennett, LLP

(57) ABSTRACT

A control system for a marine vessel that includes a drive source and an operator that receives an operation is able to switch a control mode of the drive source without providing an additional operator. An operation received by the operator when the drive source is resting is disabled, and a function of switching a control mode of the drive source is assigned to the operation of the operator that is received when the drive source is resting.

12 Claims, 14 Drawing Sheets

CONTROL SYSTEM FOR SMALL MARINE VESSEL

CROSS REFERENCE TO RELATED APPLICATIONS

This application claims the benefit of priority to Japanese Patent Application No. 2020-046398 filed on Mar. 17, 2020. The entire contents of this application are hereby incorporated herein by reference.

BACKGROUND OF THE INVENTION

1. Field of the Invention

The present invention relates to a control system for a small marine vessel including a drive source.

2. Description of the Related Art

For a small marine vessel with a capacity of about one to three persons such as a small planing boat which travels by a water jet propulsion device, a control mode of an engine which functions as the drive source, for example, an output suppressing mode in which an output of the engine is restricted, an acceleration priority mode excelling in acceleration, or the like, is set. Such control modes of the engine are switched by operating a push button of a remote controller switch provided separately from a hull (for example, refer to YAMAHA HATSUDOKI KABUSHIKI KAISHA, "Manual for Marine Jet VXR", August, 2017).

While the marine vessel is travelling, the remote controller switch is often housed in a glove compartment of the hull, and thus it is difficult for a vessel operator to switch the control mode of the engine by operating the remote controller switch. To compensate for this, it is conceivable to provide a switch for switching the control mode of the engine on a steering handle held by the vessel operator while the marine vessel is travelling.

In the small planing boat, however, since the steering handle does not have a big size and includes a start switch, a stop switch, and a lanyard switch, the steering handle does not have enough room for providing an additional switch. In addition, providing an additional switch increases the manufacturing cost. Therefore, it is not preferable to provide an additional switch for switching the control mode of the engine.

SUMMARY OF THE INVENTION

Preferred embodiments of the present invention provide control systems for marine vessels that are each able to switch a control mode of a drive source without providing an additional operator.

According to a preferred embodiment of the present invention, a control system for a marine vessel including a drive source and an operator that receives an operation, the control system includes a processor, and a non-transitory storage medium including program instructions stored thereon, execution of which by the processor causes the control system to disable an operation received by the operator when the drive source is resting, and assign a function of switching a control mode of the drive source to the operation received by the operator when the drive source is resting.

According to the present preferred embodiment, in regard to the operator to which operation received when the drive source is resting is disabled, the function of switching the control mode of the drive source is assigned to the operation of the operator when the drive source is resting. Therefore, it is possible to receive the operation to switch the control mode of the drive source without impairing a function originally assigned to the operation of the operator and without providing an additional operator.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
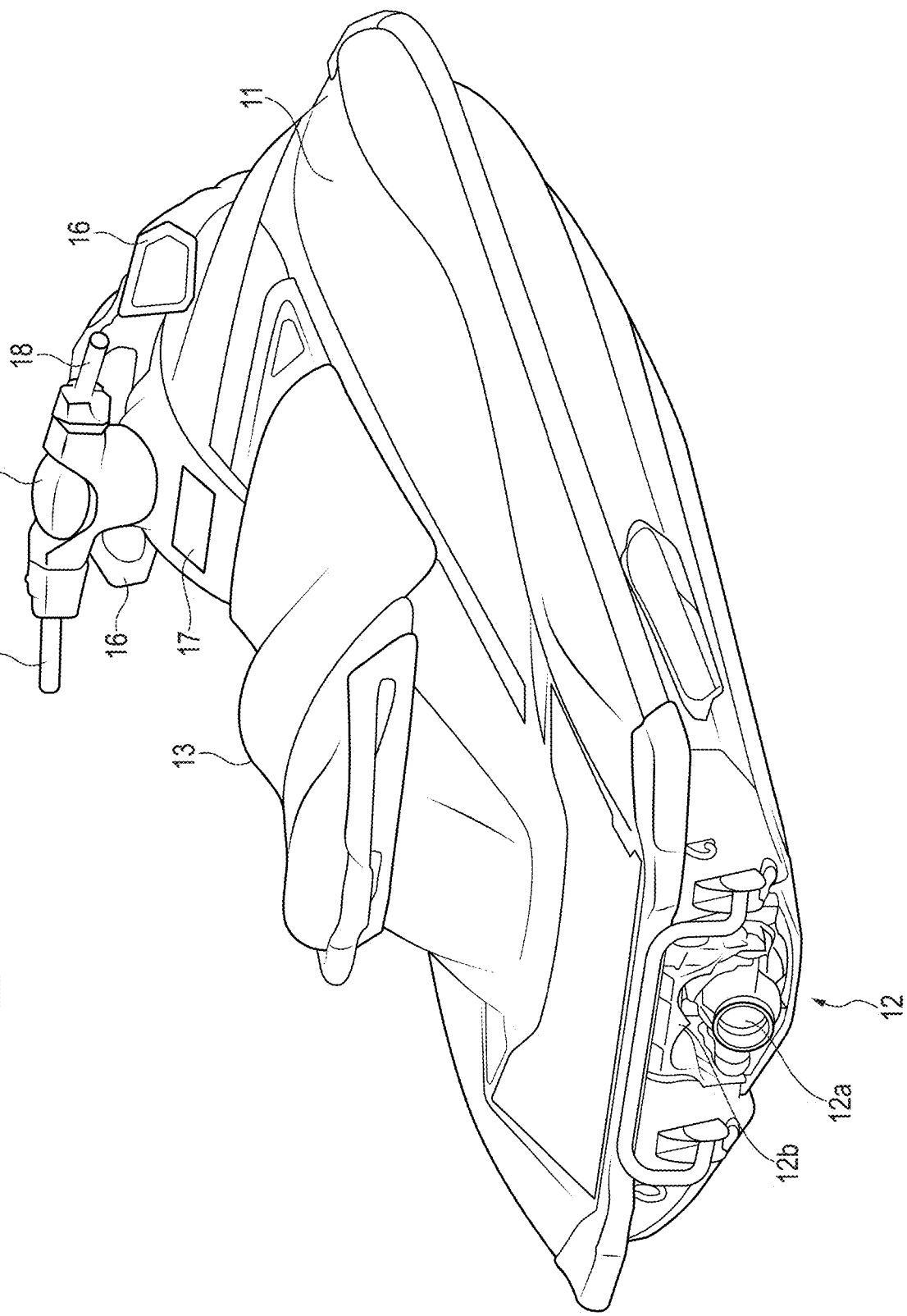
FIG. 1 is a perspective view showing a rear view of a saddle riding type small marine vessel to which a control system according to a first preferred embodiment of the present invention is applied.

FIG. 1 is a perspective view showing a rear view of a saddle riding type small marine vessel to which a control system according to a first preferred embodiment of the present invention is applied. The marine vessel 10 is, for example, a small planing boat which has a capacity of not more than three persons and travels by a jet propulsion device 12 provided on a stern side of a hull 11.

The marine vessel 10 includes a seat 13 for a vessel operator and passengers provided approximately in a center of the hull 11, a steering handle 14 provided on a front side of the hull 11, and an engine 15 (drive source) provided inside the hull 11. The steering handle 14 is pivotally operable in a horizontal direction, and a jet nozzle 12a of the jet propulsion device 12 pivots in the horizontal direction in conjunction with a pivotal movement of the steering handle 14.

Ahead of the steering handle 14, rearview mirrors 16 are provided on either side, and a multifunction meter 17 (display) which displays various types of information regarding the marine vessel 10 is provided between the steering handle 14 and the seat 13.

On right and left ends of the steering handle 14, a right handlebar 18 and a left handlebar 19 are respectively provided. While on board, the vessel operator holds the right handlebar 18 and the left handlebar 19 with both hands to operate the steering handle 14 so as to cause the jet nozzle 12a to pivot to steer the marine vessel 10.

Figure 2:
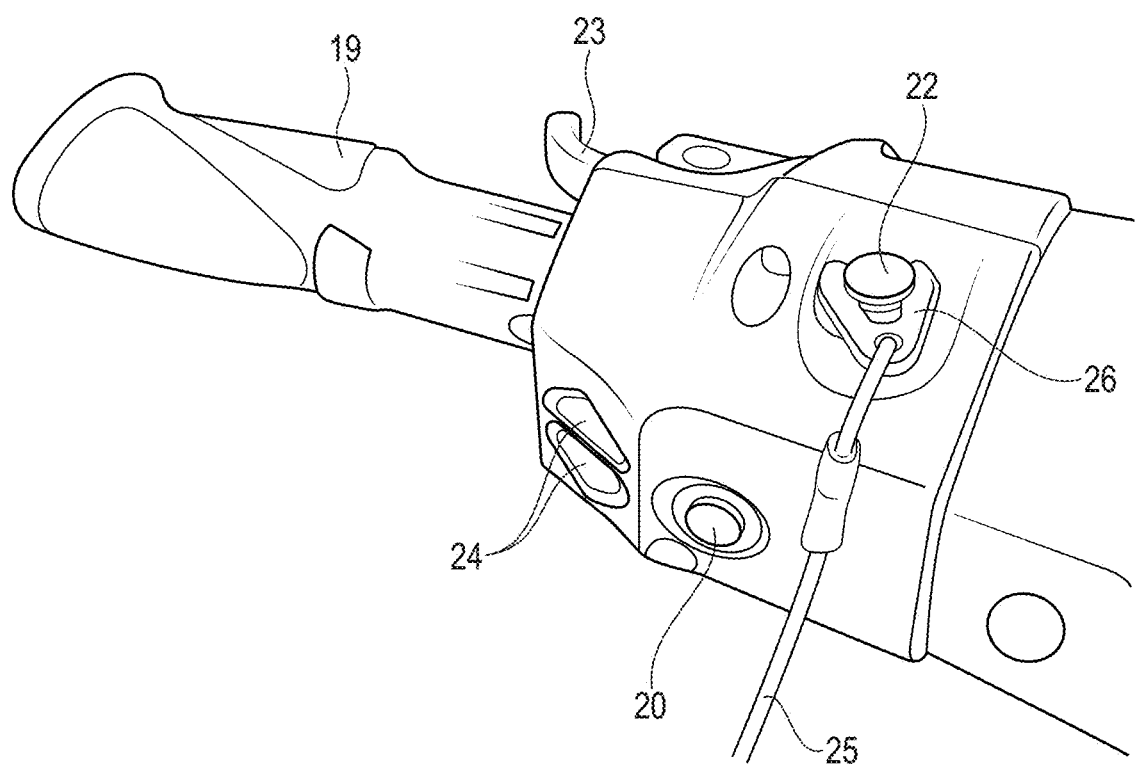
FIG. 2 is an enlarged partial perspective view showing a configuration in the vicinity of a left handlebar of the marine vessel in FIG. 1.
Figure 3:
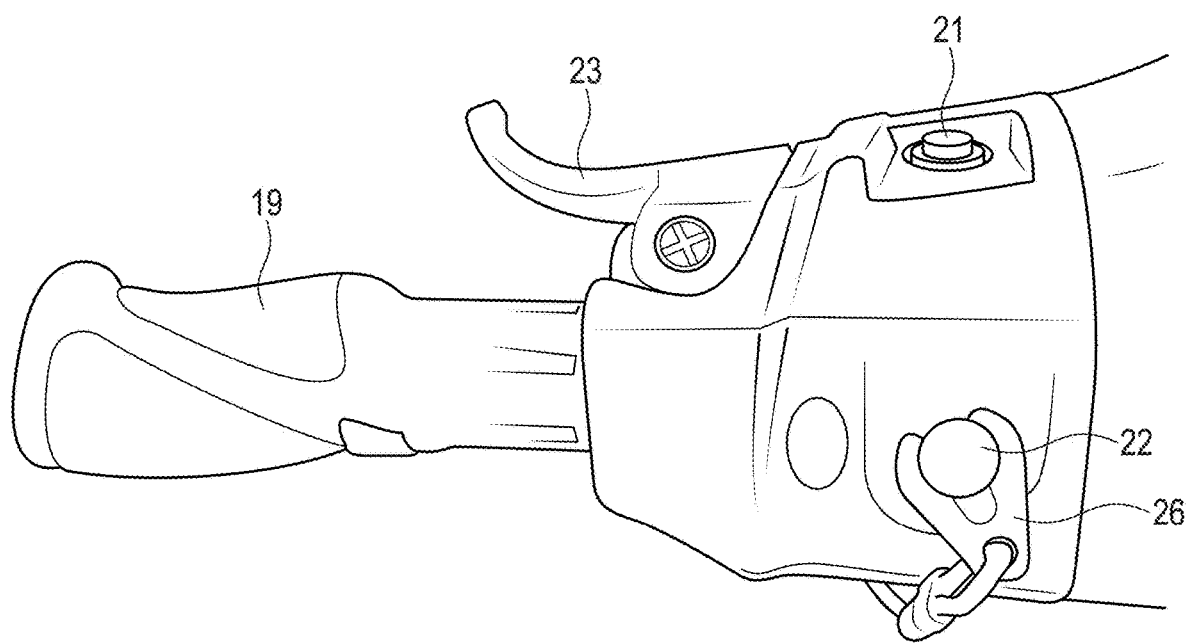
FIG. 3 is an enlarged partial perspective view showing a configuration in the vicinity of the left handlebar of the marine vessel in FIG. 1.

FIGS. 2 and 3 are enlarged partial perspective views showing a configuration in the vicinity of the left handlebar 19. FIG. 2 shows the left handlebar 19 when viewed from diagonally above and rearward to the right, and FIG. 3 shows the left handlebar 19 when viewed from above.

In the vicinity of the left handlebar 19, a start switch 20, a stop switch 21, a lanyard switch 22, a reverse lever 23, and a trim switch 24 are provided as operators. These operators are all located at positions where the vessel operator is able to operate them with his/her left fingers when the vessel operator holds the left handlebar 19 with his/her left hand.

The start switch 20, which is preferably a push button, is a starting button for the engine 15. When the vessel operator presses and activates the start switch 20, a starter motor (not shown) inside the hull 11 is operated to cause the engine 15 to start. The stop switch 21, which is preferably a push button, is a resting switch for the engine 15. When the vessel operator presses and activates the stop switch 21, the engine 15 stops.

The lanyard switch 22 is an emergency resting switch for the engine 15 and is urged toward the steering handle 14 by an urging member located inside the steering handle 14. In a normal state, the lanyard switch 22 is engaged with a fork-shaped hook 26 provided on one end of a string-shaped lanyard 25 which is fastened to a wrist or the like of the vessel operator so that the lanyard switch 22 is prevented from moving toward the steering handle 14. When, for example, the vessel operator falls overboard and the hook 26 disengages from the lanyard switch 22, the lanyard switch 22 in turn moves toward the steering handle 14 by an urging force and is activated. Then, an engine emergency stop signal is transmitted from the lanyard switch 22 to an ECU 28, to be described below, so as to cause the engine 15 to quickly stop.

The reverse lever 23 is a lever switch to move a reverse gate 12b which covers the jet nozzle 12a of the jet propulsion device 12. When the reverse lever 23 is pulled, the reverse gate 12b moves to cover the jet nozzle 12a so that a water flow ejected from the jet nozzle 12a is directed forward of the hull 11. As a result, the marine vessel 10 moves backward. The trim switch 24 vertically changes an orientation of the jet nozzle 12a to adjust a trim (a tilting angle in front and rear directions) of the hull 11.

Figure 4:
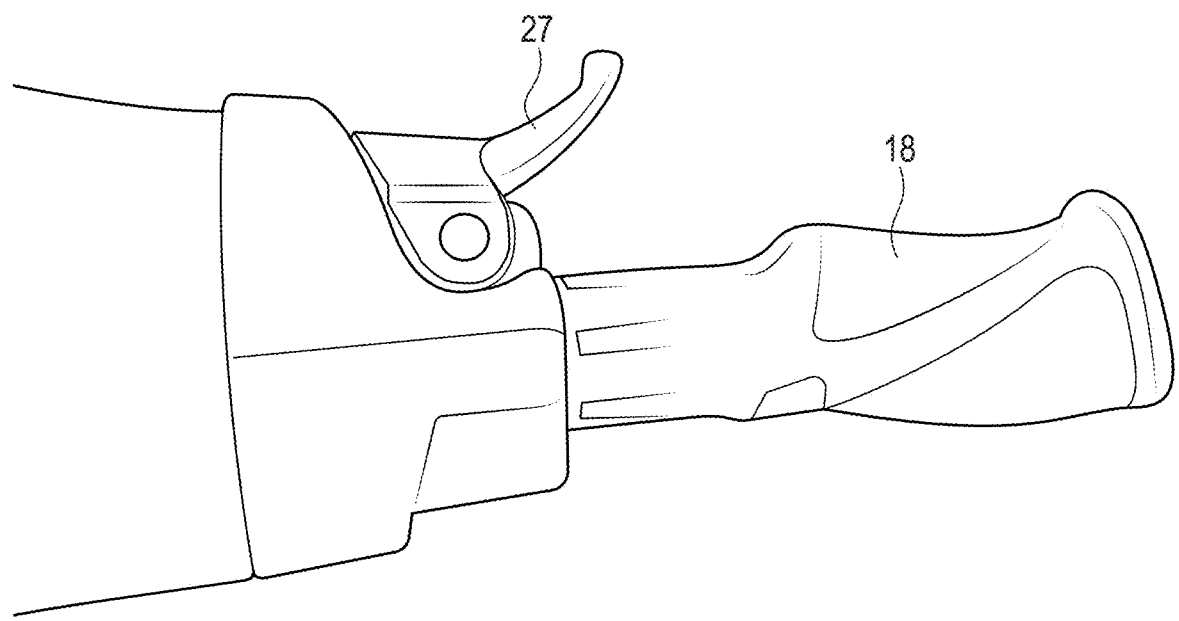
FIG. 4 is an enlarged partial perspective view showing a configuration in the vicinity of a right handlebar of the marine vessel in FIG. 1.

FIG. 4 is an enlarged partial perspective view showing a configuration in the vicinity of the right handlebar 18 when viewed from above the right handlebar 18. In the vicinity of the right handlebar 18, a throttle lever 27 is provided as an operator. The throttle lever 27 is located at a position where the vessel operator is able to operate it with a right finger when the vessel operator holds the right handlebar 18 with his/her right hand.

The throttle lever 27 is a lever switch to adjust an output of the engine 15, and the vessel operator activates the throttle lever 27 by pulling the throttle lever 27. An engine speed of the engine 15 changes based on how much the vessel operator pulls the throttle lever 27.

Figure 5:
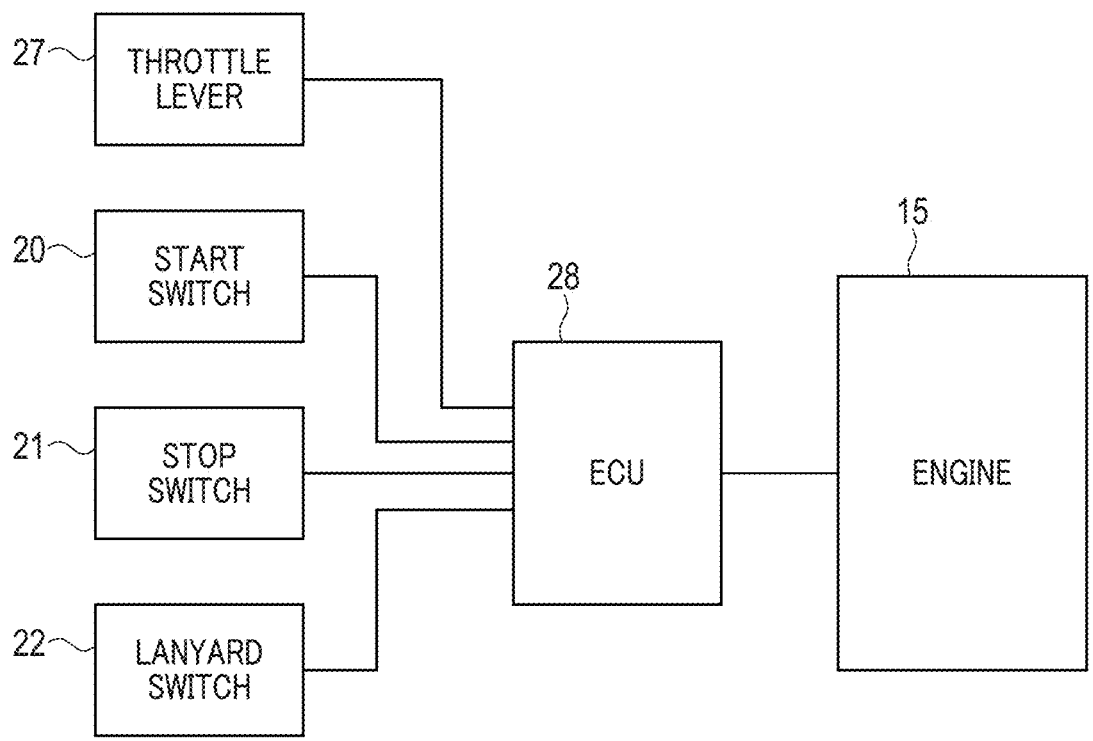
FIG. 5 is a block diagram schematically showing a configuration of the control system according to the first preferred embodiment of the present invention.

FIG. 5 is a block diagram schematically showing a configuration of the control system for the small marine vessel according to the present preferred embodiment. The marine vessel 10 includes the ECU 28 that defines and functions as a controller for the engine 15, wherein the ECU 28 controls the engine speed of the engine 15. The engine 15 rotates an impeller (not shown) of the jet propulsion device 12, and the rotating impeller generates the water flow to be ejected from the jet nozzle 12a. Therefore, the ECU 28 controls a flow rate of the water flow by controlling the engine speed of the engine 15 so as to control a vessel speed of the marine vessel 10.

Figure 6:
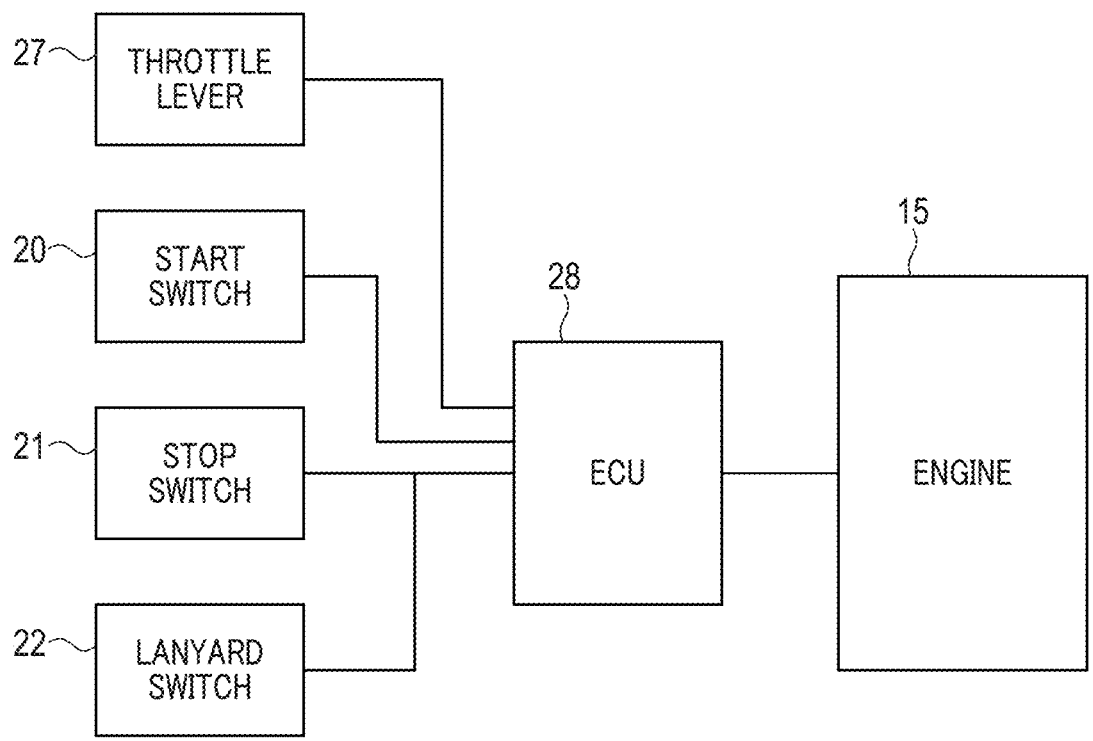
FIG. 6 is a block diagram schematically showing a variation of a configuration of the control system according to the first preferred embodiment of the present invention.

The ECU 28 is connected to the throttle lever 27, the start switch 20, the stop switch 21, and the lanyard switch 22, individually, as well as the engine 15, receives a signal generated when those operators are operated, and provides an operation of the engine 15 based on the signal. For example, in a case in which the start switch 20 is operated (pressed) and transmits an engine start signal to the ECU 28, the ECU 28 causes the engine 15 to start. In a case in which the stop switch 21 is operated (pressed) and transmits an engine stop signal to the ECU 28, the ECU 28 causes the engine 15 to stop. In a case in which the hook 26 comes off the lanyard switch 22 to activate the lanyard switch 22, the lanyard switch 22 transmits the engine emergency stop signal to the ECU 28, and the ECU 28 causes the engine 15 to quickly stop. In a case in which the throttle lever 27 is operated (pulled) and transmits a throttle opening signal corresponding to a throttle opening angle to the ECU 28, the ECU 28 adjusts an opening angle of a throttle valve of the engine 15 to control the engine speed of the engine 15. It should be noted that in FIG. 5, the stop switch 21 and the lanyard switch 22 are individually connected to the ECU 28; however, the lanyard switch 22 may be connected to the ECU 28 via wiring branched from wiring that connects the stop switch 21 and the ECU 28 as shown in FIG. 6.

In the marine vessel 10, a predetermined condition (hereinafter, refer to "a disabling condition") is set for each operator. In the disabling condition, even when an operator receives an operation by the vessel operator, a function originally assigned to the operator is not performed. The following are examples of the disabling conditions:

- a condition in which even when the start switch 20 or a start/stop switch 30, to be described below, receives an operation, the engine 15 is not caused to start by the operation;
- a condition in which even when the stop switch 21 or the start/stop switch 30 receives an operation, the engine 15 is not caused to stop by the operation;
- a condition in which even when the lanyard switch 22 receives an operation, the engine 15 is not caused to quickly stop by the operation; and
- a condition in which even when the throttle lever 27 receives an operation, the engine speed of the engine 15 is not controlled by the operation.

The above disabling conditions are stored, for example, in a memory of the ECU 28. Upon receiving a signal generated when each operator is operated, the ECU 28 refers to the disabling conditions and determines whether to disable the operation of the respective operator. When it is determined to disable the operation, the ECU 28 does not perform a control (function) of the engine 15 corresponding to the received signal.

In the present preferred embodiment, for example, conditions including "the engine 15 is resting", "the engine 15 is working (is being operated)", "the lanyard switch 22 is in operation", "the stop switch 21 is in operation", and "the throttle lever 27 is in operation" are provided as the disabling conditions. It should be noted that in the present preferred embodiment, the condition "the engine 15 is resting" corresponds to any of a state in which the engine 15 is stopped, and a state in which a power source of the ECU 28 is OFF. Moreover, the condition "the engine 15 is working" corresponds to any of a state in which the engine 15 is being operated, a state in which the engine speed of the engine 15 is kept at a predetermined number, for example, about 1000 rpm or more, and a state in which the engine 15 is idling (for example, the engine speed of the engine 15 is controlled to be about 1000 rpm or more and about 3000 rpm or less, preferably about 1300 rpm or less).

When an operation from the start switch 20 is interrupted after the start switch 20 is operated and before the engine 15 starts, the engine 15 does not start. Thus, a function of starting the engine 15 in response to operation of the start switch 20 is not completely executed. Namely, the operation from the start switch 20 in this case is considered to be disabled. Moreover, when an operation from the stop switch 21 is interrupted after the stop switch 21 is operated and before the engine 15 stops, the engine 15 does not stop. Thus, a function of stopping the engine 15 in response to operation of the stop switch 21 is not completely executed. Namely, the operation from the stop switch 21 in this case is also considered to be disabled.

In the present preferred embodiment, as the disabling conditions for the throttle lever 27, the conditions include "the engine 15 is resting", "the lanyard switch 22 is in operation", and "the stop switch 21 is in operation". As the disabling conditions for the lanyard switch 22, the conditions include "the engine 15 is resting" and "the stop switch 21 is in operation". As the disabling conditions for the start switch 20, the conditions include "the engine 15 is working", "the lanyard switch 22 is in operation", "the stop switch 21 is in operation", and "an operation of the start switch 20 is interrupted after the start switch 20 is operated and before the engine 15 starts". Further, as the disabling conditions for the stop switch 21, the conditions include "the engine 15 is resting", "the lanyard switch 22 is in operation", and "an operation of the stop switch 21 is interrupted after the stop switch 21 is operated and before the engine 15 stops".

In regard to an operator of which a received operation is disabled since a current situation corresponds to the disabling condition, even if another function is assigned to the received operation when the current situation corresponds to the disabling condition, the another function does not interfere with a function originally assigned to the operator. Therefore, in the present preferred embodiment, for each operator, another function, specifically, a function of switching a control mode of the engine 15 is assigned to a received operation when the current situation corresponds to the disabling condition.

Figure 7:
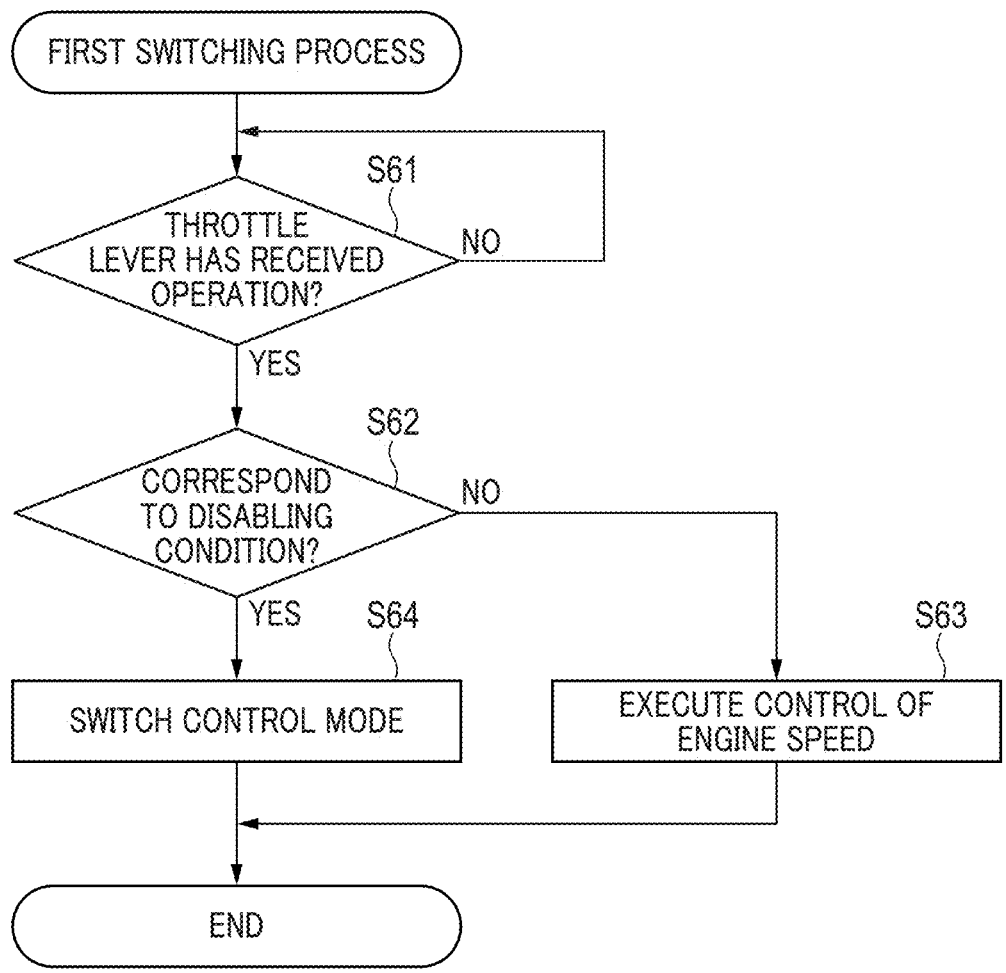
FIG. 7 is a flowchart showing a first switching process.

FIG. 7 is a flowchart showing a first switching process of switching the control mode of the engine 15. The process in FIG. 7 is performed by a CPU of the ECU 28 executing a control program stored in the memory and so on.

In the process in FIG. 7, at first, the ECU 28 determines whether the throttle lever 27 has received an operation based on whether the ECU 28 has received the throttle opening signal from the throttle lever 27 (step S61).

Then, when it is determined that the throttle lever 27 has received the operation, the ECU 28 determines whether the current situation corresponds to any of the disabling conditions for the throttle lever 27, that is, whether the current situation corresponds to any of the conditions "the engine 15 is resting", "the lanyard switch 22 is in operation", and "the stop switch 21 is in operation" (step S62).

When it is determined that the current situation does not correspond to any of the disabling conditions, the ECU 28 controls the engine speed of the engine 15 based on the received throttle opening signal (step S63), and ends the present process. On the other hand, when it is determined that the current situation corresponds to any of the disabling conditions, the ECU 28 switches the control mode of the engine 15 (step S64), and ends the present process. In this case, the control mode of the engine 15 is switched, for example, from a normal mode to an output suppressing mode (L mode) or an acceleration priority mode that is set in advance.

It should be noted that, in the process in FIG. 7, the function of switching the control mode of the engine 15 is assigned to a single operation of the throttle lever 27; however, the function of switching the control mode of the engine 15 may be assigned to multiple operations of the throttle lever 27. In this case, for example, even when the current situation corresponds to the disabling condition, the control mode of the engine 15 is not switched by a single operation of the throttle lever 27, but switched only after multiple operations of the throttle lever 27.

Figure 8:
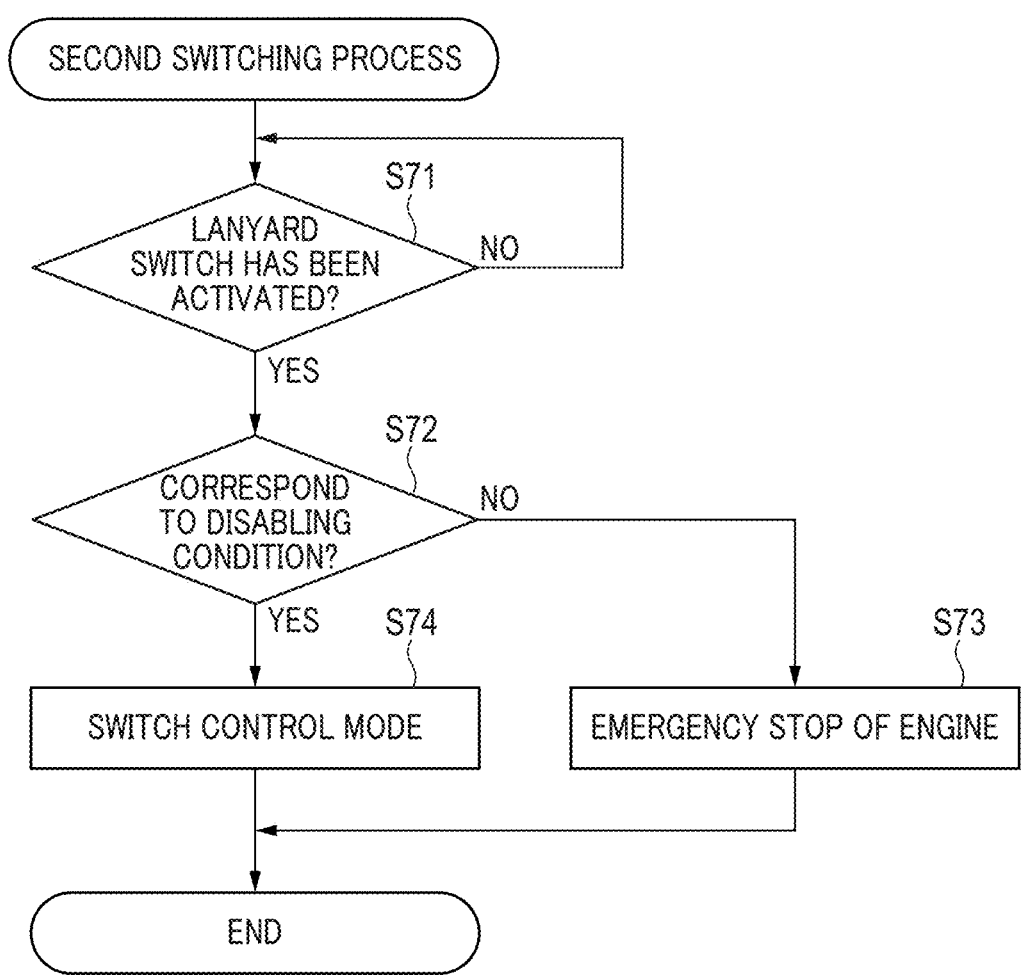
FIG. 8 is a flowchart showing a second switching process.

FIG. 8 is a flowchart showing a second switching process of switching the control mode of the engine 15. The process in FIG. 8 is also performed by the CPU of the ECU 28 executing a control program stored in the memory and so on.

In the process in FIG. 8, at first, the ECU 28 determines whether the lanyard switch 22 has been activated based on whether the ECU 28 has received the engine emergency stop signal from the lanyard switch 22 (step S71).

Then, when it is determined that the lanyard switch 22 has been activated, the ECU 28 determines whether the current situation corresponds to any of the disabling conditions for the lanyard switch 22, that is, whether the current situation corresponds to any of the conditions "the engine 15 is resting" and "the stop switch 21 is in operation" (step S72).

When it is determined that the current situation does not correspond to any of the disabling conditions, the ECU 28 quickly stops the engine 15 based on the received engine emergency stop signal (step S73), and ends the present process. On the other hand, when it is determined that the current situation corresponds to any of the disabling conditions, the EUC 28 switches the control mode of the engine 15 (step S74), and ends the present process. In this case as well, the control mode of the engine 15 is switched to, for example, the output suppressing mode or the acceleration priority mode.

Figure 9:
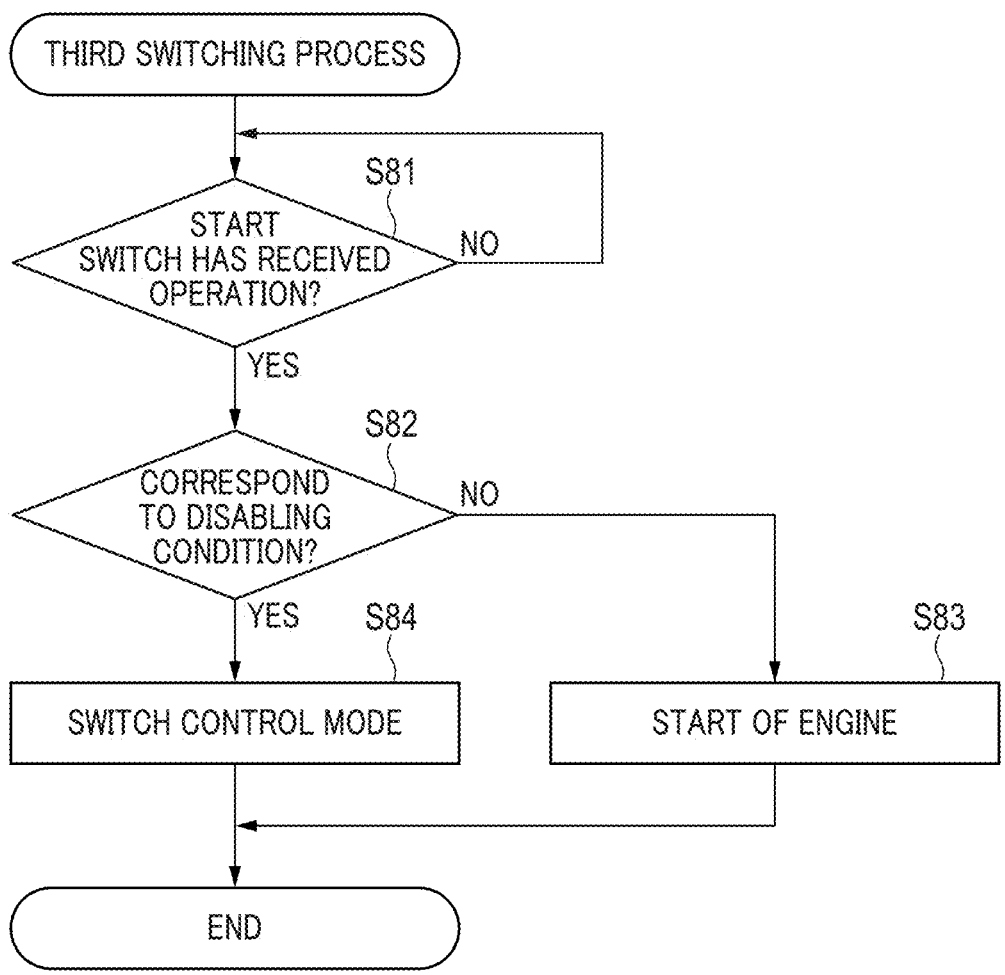
FIG. 9 is a flowchart showing a third switching process.

FIG. 9 is a flowchart showing a third switching process of switching the control mode of the engine 15. The process in FIG. 9 is also performed by the CPU of the ECU 28 executing a control program stored in the memory and so on.

In the process in FIG. 9, at first, the ECU 28 determines whether the start switch 20 has received an operation based on whether the ECU 28 has received the engine start signal from the start switch 20 (step S81).

Then, when it is determined that the start switch 20 has received the operation, the ECU 28 determines whether the current situation corresponds to any of the disabling conditions for the start switch 20, that is, whether the current situation corresponds to any of the conditions "the engine 15 is working", "the lanyard switch 22 is in operation", "the stop switch 21 is in operation", and "an operation of the start switch 20 is interrupted after the start switch 20 is operated and before the engine 15 starts" (step S82).

When it is determined that the current situation does not correspond to any of the disabling conditions, the ECU 28 activates the engine 15 based on the received engine start signal (step S83), and ends the present process. On the other hand, when it is determined that the current situation corresponds to any of the disabling conditions, the ECU 28 switches the control mode of the engine 15 (step S84), and ends the present process. In this case as well, the control mode of the engine 15 is switched to, for example, the output suppressing mode or the acceleration priority mode.

It should be noted that in the process in FIG. 9, the function of switching the control mode of the engine 15 is assigned to a single operation of the start switch 20; however, the function of switching the control mode of the engine 15 may be assigned to multiple operations of the start switch 20.

Figure 10:
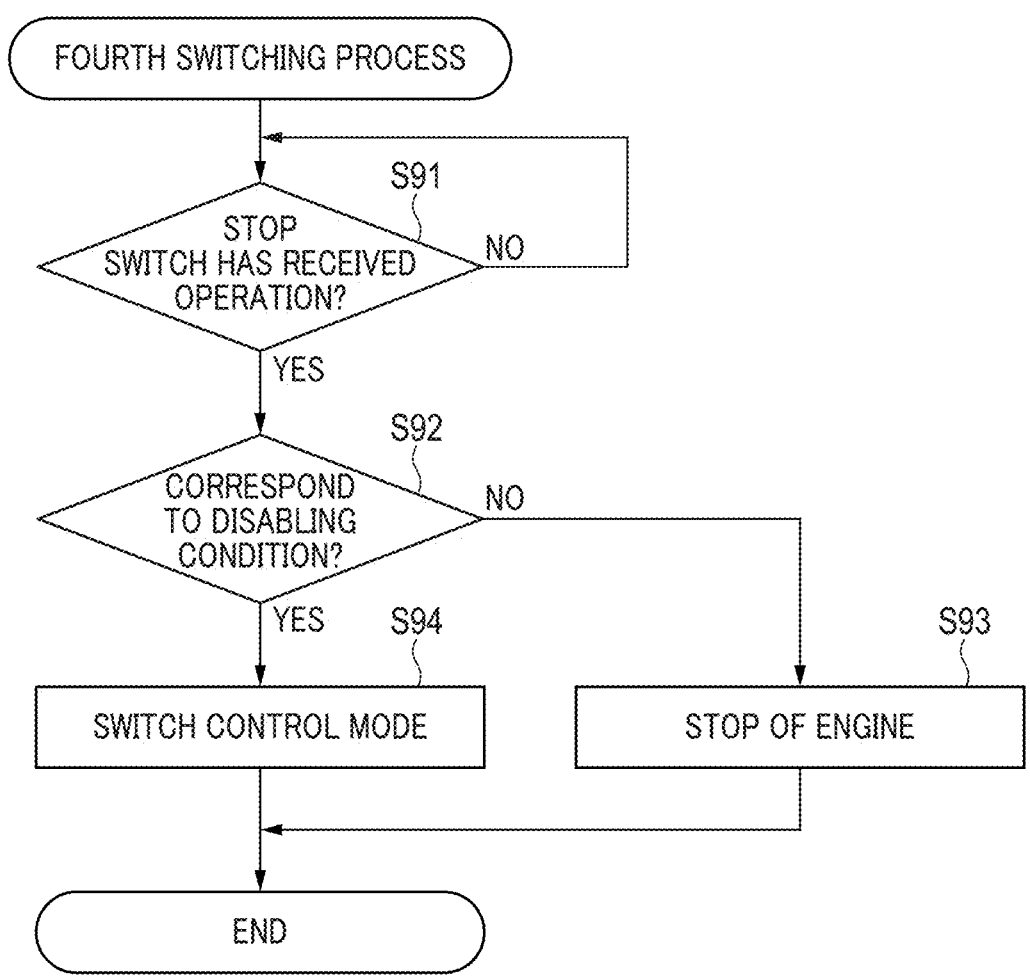
FIG. 10 is a flowchart showing a fourth switching process.

FIG. 10 is a flowchart showing a fourth switching process of switching the control mode of the engine 15. The process in FIG. 10 is also performed by the CPU of the ECU 28 executing a control program stored in the memory and so on.

In the process in FIG. 10, the ECU 28 determines whether the stop switch 21 has received an operation based on whether the ECU 28 has received the engine stop signal from the stop switch 21 (step S91).

Then, when it is determined that the stop switch 21 has received the operation, the ECU 28 determines whether the current situation corresponds to any of the disabling conditions for the stop switch 21, that is, whether the current situation corresponds to any of the conditions "the engine 15 is resting", "the lanyard switch 22 is in operation", and "an operation of the stop switch 21 is interrupted after the stop switch 21 is operated and before the engine 15 stops" (step S92).

When it is determined that the current situation does not correspond to any of the disabling conditions, the ECU 28 deactivates the engine 15 based on the received engine stop signal (step S93), and ends the present process. On the other hand, when it is determined that the current situation corresponds to any of the disabling conditions, the EUC 28 switches the control mode of the engine 15 (step S94), and ends the present process. In this case as well, the control mode of the engine 15 is switched to, for example, the output suppressing mode or the acceleration priority mode.

It should be noted that in the process in FIG. 10, the function of switching the control mode of the engine 15 is assigned to a single operation of the stop switch 21; however, the function of switching the control mode of the engine 15 may be assigned to multiple operations of the stop switch 21.

According to the present preferred embodiment, in regard to the throttle lever 27, the lanyard switch 22, the start switch 20, and the stop switch 21, an operation of each of these operators is disabled when the current situation corresponds to the disabling condition, and the function of switching the control mode of the engine 15 is assigned to the received operation when the current situation corresponds to the disabling condition. As a result, it is possible to receive an operation to switch the control mode of the engine 15 without impairing the functions originally assigned to the throttle lever 27, the lanyard switch 22, the start switch 20, and the stop switch 21 and without providing an additional operator.

Figure 11:
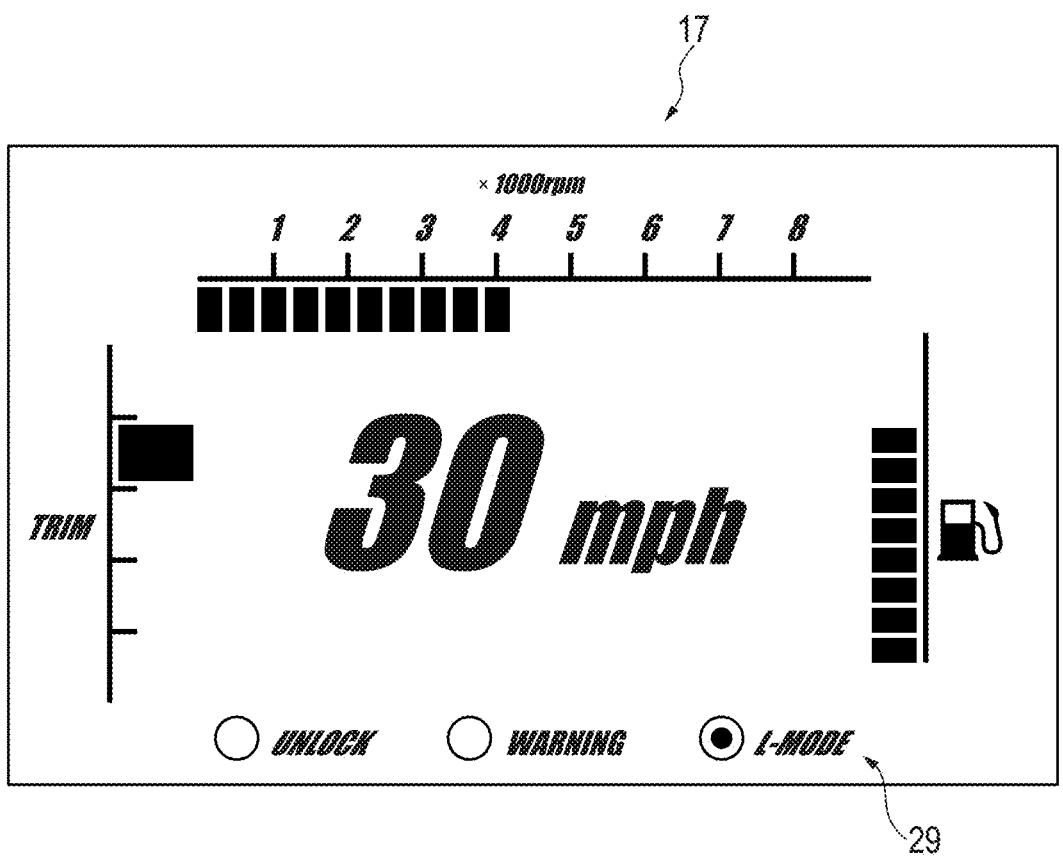
FIG. 11 is a diagram showing an example of a multifunction meter of the marine vessel in FIG. 1.

Moreover, according to the present preferred embodiment, an existing operator not only receives the operation to switch the control mode of the engine 15 without providing an additional operator but also is operable for the original function. Therefore, it may be difficult for the vessel operator to understand whether the control mode of the engine 15 of the marine vessel 10 has been switched only by looking at the operator. Accordingly, it is preferable to provide the multifunction meter 17 with indicators that indicate whether the control mode of the engine 15 has been switched, for example, indicators 29 that indicate that the control mode has been switched to the output suppressing mode, for example (FIG. 11).

Description will be provided of a second preferred embodiment of the present invention. The second preferred embodiment is substantially the same as the first preferred embodiment described above in terms of constructions and operations, and differs only in providing a start/stop switch in place of the start switch 20 and the stop switch 21. Constructions and operations equivalent to those in the first preferred embodiment will thus not be described, only constructions and operations different from those in the first preferred embodiment will be described below.

Figure 12:
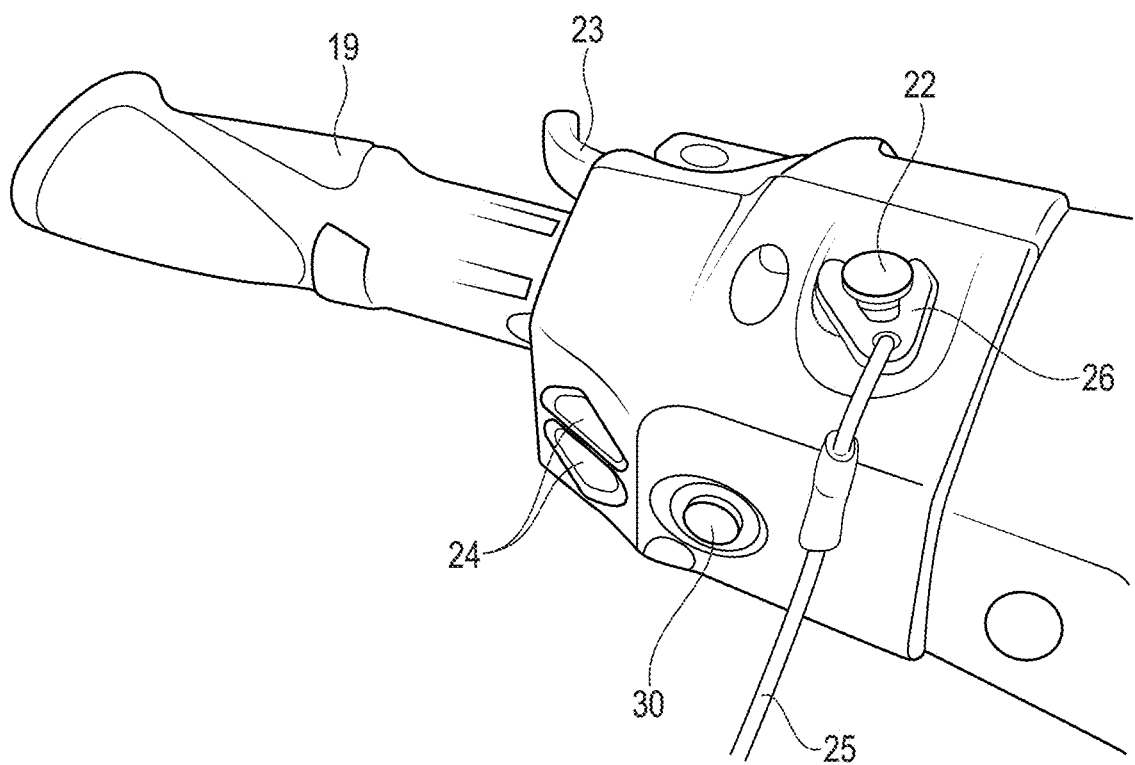
FIG. 12 is an enlarged partial perspective view showing a configuration in the vicinity of a left handlebar of a small marine vessel according to a second preferred embodiment of the present invention.

FIG. 12 is an enlarged partial perspective view showing a configuration in the vicinity of a left handlebar 19 of a marine vessel 10 according to the second preferred embodiment of the present invention. In the present preferred embodiment, the stop switch 21 is dispensed with, and a start/stop switch 30 (a switch for both starting and stopping) which is preferably a push switch is provided in place of the start switch 20.

Figure 13:
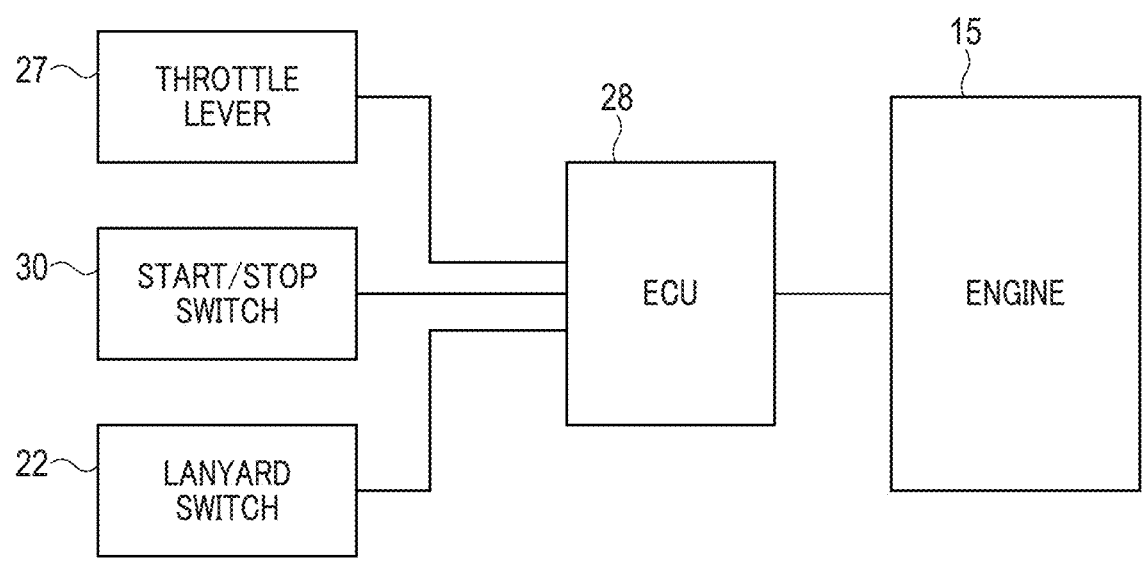
FIG. 13 is a block diagram schematically showing a configuration of a control system according to the second preferred embodiment of the present invention.

The start/switch 30 is used as both a start switch and a stop switch for the engine 15. When the engine 15 is stopped, and the vessel operator presses and activates the start/stop switch 30, the engine 15 starts. On the other hand, when the engine 15 is working, and the vessel operator presses and activates the start/stop switch 30, the engine 15 stops. That is, when operated while the engine 15 is stopped, the start/stop switch 30 transmits the engine start signal to the ECU 28, and when operated while the engine 15 is working, the start/stop switch 30 transmits the engine stop signal to the ECU 28. It should be noted that in the present preferred embodiment, the throttle lever 27, the lanyard switch 22, and the start/stop switch 30 are individually connected to the ECU 28 as shown in FIG. 13.

In the present preferred embodiment, for example, as the disabling conditions for the throttle lever 27, the conditions include "the engine 15 is resting", "the lanyard switch 22 is in operation", "the start/stop switch 30 is in operation while the engine 15 is resting". Moreover, as the disabling conditions for the lanyard switch 22, the conditions include "the engine 15 is resting" and "the start/stop switch 30 is in operation while the engine 15 is resting".

In addition, as the disabling conditions for the start/stop switch 30, the conditions include "the lanyard switch 22 is in operation", "an operation of the start/stop switch 30 is interrupted after the start/stop switch 30 has been operated while the engine 15 is resting and before the engine 15 starts", and "an operation of the start/stop switch 30 is interrupted after the start/stop switch 30 has been operated while the engine 15 is working and before the engine 15 stops".

Figure 14:
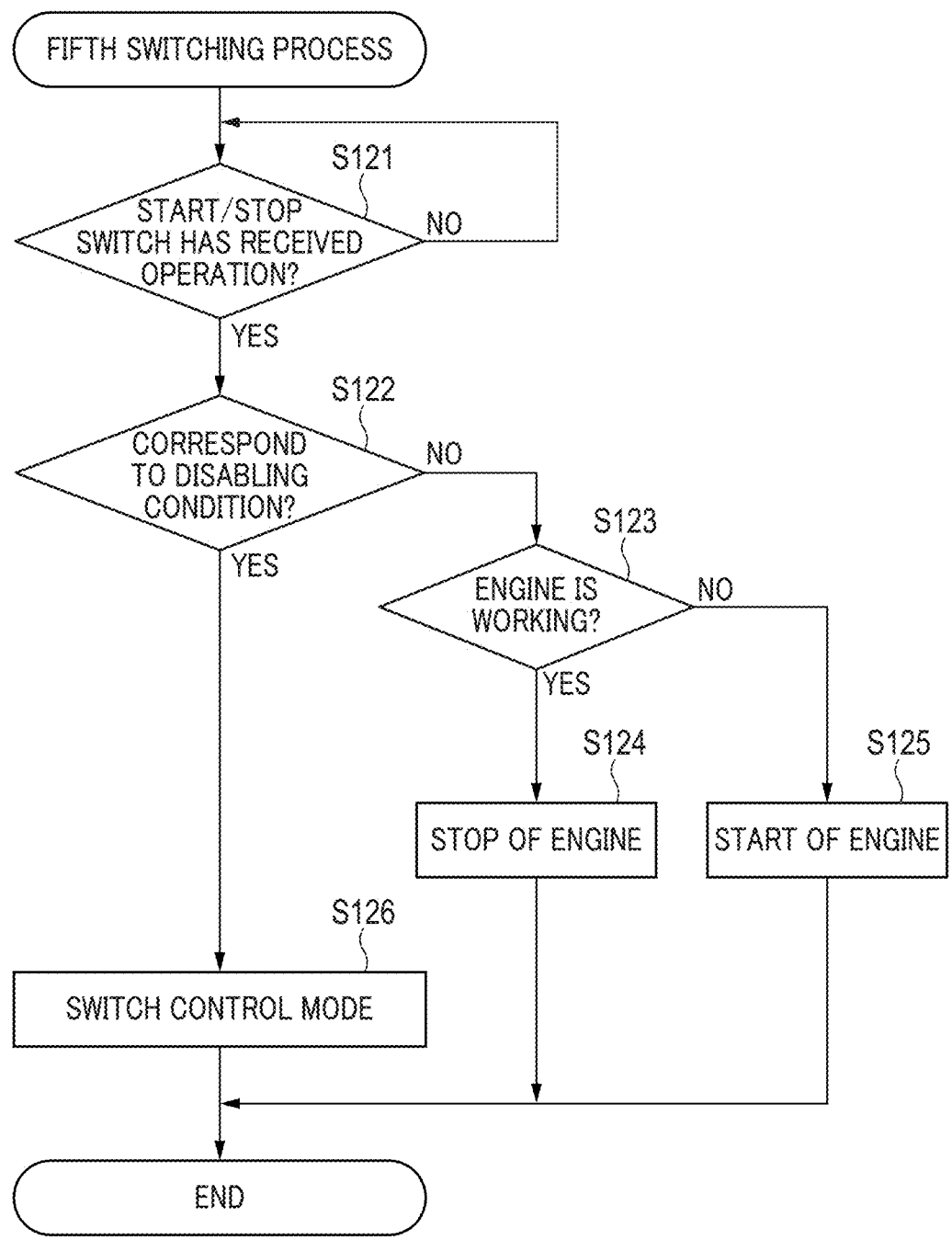
FIG. 14 is a flowchart showing a fifth switching process.

FIG. 14 is a flowchart showing a fifth switching process of switching the control mode of the engine 15. The process in FIG. 14 is performed by the CPU of the ECU 28 executing a control program stored in the memory and so on.

In the process in FIG. 14, at first, the ECU 28 determines whether the start/stop switch 30 has received an operation based on whether the ECU 28 has received the engine start signal or the engine stop signal from the start/stop switch 30 (step S121).

Then, when it is determined that the start/stop switch 30 has received the operation, the ECU 28 determines whether the current situation corresponds to any of the disabling conditions for the start/stop switch 30, that is, whether the current situation corresponds to any of the conditions "the lanyard switch 22 is in operation", "an operation of the start/stop switch 30 is interrupted after the start/stop switch 30 is operated while the engine 15 is resting and before the engine 15 starts", and "an operation of the start/stop switch 30 is interrupted after the start/stop switch 30 is operated while the engine 15 is working and before the engine 15 stops" (step S122).

When it is determined that the current situation does not correspond to any of the disabling conditions, the ECU 28 further determines whether the engine 15 is working (step S123). When it is determined that the engine 15 is working, the ECU 28 deactivates the engine 15 (step S124), and when it is determined that the engine 15 is resting, the ECU 28 activates the engine 15 (step S125).

On the other hand, when it is determined that the current situation corresponds to any of the disabling conditions, the ECU 28 switches the control mode of the engine 15 (step S126), and ends the present process. In this case as well, the control mode of the engine 15 is switched to, for example, the output suppressing mode or the acceleration priority mode.

It should be noted that in the process in FIG. 14, the function of switching the control mode of the engine 15 is assigned to a single operation of the start/stop switch 30; however, the function of switching the control mode of the engine 15 may be assigned to multiple operations of the start/stop switch 30.

In the second preferred embodiment, the same process as the first switching process in FIG. 7 or the second switching process in FIG. 8 is executed based on an operation of the throttle lever 27 or activation of the lanyard switch 22.

In the second preferred embodiment as well, in regard to the throttle lever 27, the lanyard switch 22, and the start/stop switch 30, the function of switching the control mode of the engine 15 is assigned to the received operation when the current situation corresponds to the disabling condition. As a result, the same effects as those in the first preferred embodiment are obtained.

While preferred embodiments of the present invention have been described above, it is to be understood that the present invention is not limited to the preferred embodiments described above, but variations and modifications will be apparent to those skilled in the art without departing from the scope and spirit of the present invention.

For example, in the preferred embodiments described above, the function of switching the control mode of the engine 15 is assigned to an operation of only one operator among the start switch 20, the stop switch 21, the lanyard switch 22, the throttle lever 27, and the start/stop switch 30. Instead, the function of switching the control mode of the engine 15 may be assigned to a combined operation of a plurality of operators having a common disabling condition.

For example, the function of switching the control mode of the engine 15 may be assigned to a combined operation of the throttle lever 27 and the stop switch 21 (for example, an operation of the stop switch 21 after an operation of the throttle lever 27) which have the disabling condition "the engine 15 is resting" in common. Moreover, for example, the function of switching the control mode of the engine 15 may be assigned to a combined operation of the throttle lever 27 and the start switch 20 (for example, an operation of the start switch 20 during an operation of the throttle lever 27) which have the disabling condition "the lanyard switch 22 is in operation" in common.

Further, the capacity of the marine vessels to which preferred embodiments of the present invention are applied is not limited to three persons or less, the marine vessels to which preferred embodiments of the present invention are applied are not limited to the saddle riding type small marine vessel, and preferred embodiments of the present invention may be applied to standing type small marine vessels with a capacity of one person. In addition, the marine vessels to which preferred embodiments of the present invention are applied may be equipped with an electric motor as a drive source in place of the engine 15 which is an internal combustion engine. In this case, the marine vessel 10 includes an ON switch for the electric motor which has the same function as the start switch 20 for the engine 15, and an OFF switch for the electric motor which has the same function as the stop switch 21 for the engine 15. The marine vessel 10 in this case also may include an ON/OFF switch for the electric motor which has the same function as the start/stop switch 30. Further, the lanyard switch 22 serves and functions as an emergency OFF switch for the electric motor, and the throttle lever 27 controls a rotation speed of the electric motor. Disabling conditions for each operator of the marine vessel 10 equipped with the electric motor are the same as those for the corresponding operator of the marine vessel 10 equipped with the engine 15, and processes of switching a control mode of the electric motor follow the processes shown in FIGS. 7 to 10, and 14.

In the preferred embodiments described above, the function of switching the control mode of the engine 15 is assigned only to operators involving an operation of the engine 15; however, the function of switching the control mode of the engine 15 may be assigned to other operators (such as the reverse lever 23 and the trim switch 24) as long as they have the disabling condition. For example, when an operation of the trim switch 24 is disabled while the engine 15 is resting, or when an operation of the reverse lever 23 is disabled while the start switch 20 is being operated, the function of switching the control mode of the engine 15 may be assigned to the operation of the trim switch 24 or the operation of the reverse lever 23.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control system for a marine vessel including a drive source and an operator that receives an operation, the control system comprising:
   a processor; and
   a non-transitory storage medium including program instructions stored thereon, execution of which by the processor causes the control system to:
      disable an operation received by the operator when the drive source is resting; and
      assign a function of switching a control mode of the drive source to the operation received by the operator when the drive source is resting.

2. The control system according to claim 1, wherein
the marine vessel includes a plurality of operators each able to receive an operation; and
the execution of the program instructions by the processor further causes the control system to:
disable operations received by the plurality of operators when the drive source is resting; and
assign the function of switching the control mode of the drive source to a combined operation received by the plurality of the operators when the drive source is resting.

3. The control system according to claim 1, wherein the drive source includes an internal combustion engine.

4. The control system according to claim 3, wherein a state in which the drive source is resting corresponds to any of a state in which the internal combustion engine is stopped and a state in which a power to a controller of the internal combustion engine is in an off state.

5. The control system according to claim 4, wherein the operator corresponds to any of a starting switch for the drive source, a resting switch for the drive source, an emergency resting switch for the drive source, a switch for both starting and resting the drive source, and a throttle lever.

6. The control system according to claim 1, wherein the drive source includes an electric motor.

7. The control system according to claim 6, wherein the operator corresponds to any of an ON switch for the electric motor, an OFF switch for the electric motor, an emergency OFF switch for the electric motor, an ON/OFF switch for the electric motor, and a throttle lever.

8. The control system according to claim 1, wherein
the marine vessel includes a display; and
when the control mode of the drive source is switched, the display displays the control mode.

9. The control system according to claim 1, wherein the marine vessel has a seating capacity of three persons or less and includes a jet propulsion device.

10. A control system for a marine vessel including a drive source and an operator that receives an operation, the control system comprising:
a processor; and
a non-transitory storage medium including program instructions stored thereon, execution of which by the processor causes the control system to:
disable an operation received by the operator when the drive source is working; and
assign a function of switching a control mode of the drive source to the operation received by the operator when the drive source is working.

11. A control system for a marine vessel including a drive source, a first operator, and a second operator, the control system comprising:
a processor; and
a non-transitory storage medium including program instructions stored thereon, execution of which by the processor causes the control system to:
disable an operation of the second operator when the first operator is being operated; and
assign a function of switching a control mode of the drive source to the operation of the second operator when the first operator is being operated.

12. A control system for a marine vessel including a drive source and an operator that receives an operation, the control system comprising:
a processor; and
a non-transitory storage medium including program instructions stored thereon, execution of which by the processor causes the control system to:
when an operation is interrupted before execution of a function corresponding to the operation is completed, interrupt the execution of the function; and
assign a function of switching a control mode of the drive source to interruption of the operation of the operator before the execution of the function corresponding to the operation is completed.

\* \* \* \* \*